Figure 1:
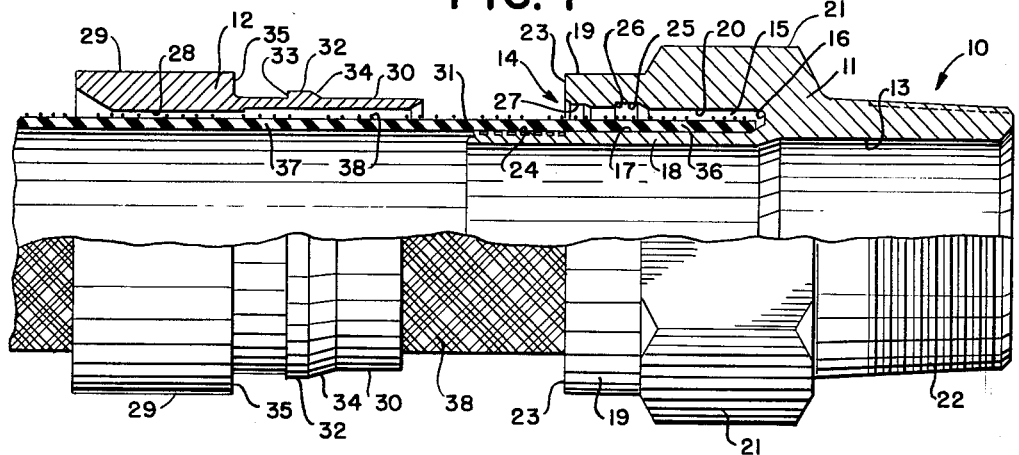

Oct. 5, 1965  W. T. BAHR  3,210,101
INTERLOCKING HOSE END FITTING
Filed May 10, 1963

INVENTOR
WILLIAM T. BAHR

BY
Pennie, Edmonds, Morton, Taylor & Adams
ATTORNEYS

United States Patent Office 3,210,101
Patented Oct. 5, 1965

3,210,101
INTERLOCKING HOSE END FITTING
William T. Bahr, Wallingford, Conn., assignor to Anaconda American Brass Company, a corporation of Connecticut
Filed May 10, 1963, Ser. No. 279,536
2 Claims. (Cl. 285—258)

This invention relates to a hose end fitting, and more particularly it relates to a hose end fitting which is comprised of two elements configured to be interlocked with a flexible hose end portion therebetween by simply force fitting the elements together.

The traditional and most universally approved manner of attaching end fittings to hose is by swaging or crimping the end portion of the hose between a ferrule surrounding the hose end portion and a tubular member positioned within the hose. This swaging equipment is not always available and as a result intricately constructed hose fittings are continuously being developed to provide an end fitting which is capable of being assembled with simple tooling. Heretofore fittings which were not swaged were characterized by having several elements which were usually assembled by being threaded together with an odd configured intermediate element therebetween, which usually served the purpose of squeezing the hose to provide an impass to fluid leakage. It is an object of the present invention to provide an end fitting comprised of only two elements which are constructed to be force fitted together with a hose end portion therebetween in a manner to allow ease of assembly without sacrificing resistance to leaking.

Broadly stated the interlocking end fitting assembly is for attachment to a hose end and is characterized by a first fitting element having an axial bore extending therethrough. An annular extended portion extends axially from the first element and is surrounded in radially spaced relationship by a flange portion also axially extending from the first element to define an annular cavity formed axially into and terminating within said first element. The cavity is formed to receive the hose end portion by inserting the extended portion within the hose end portion. A second fitting element has an axial bore of sufficient diameter to fit about the hose extending therethrough. The second element has an end portion of substantial thickness and an annular stem portion of substantially smaller thickness. The stem portion is constructed to be force-fit into the cavity when the first and second elements are substantially co-axially aligned with the composite thickness of said stem portion and said hose in its uncompressed state being substantially greater than the thickness of the cavity so as to swage the stem portion and the hose end portion in tight radial compression against the extended portion.

It is also desirable to have a stem portion with an outside diameter substantially larger than the inside diameter of the flange portion. Furthermore, it is contemplated to provide a cavity which is larger than the composite thickness of the stem portion and the hose in its uncompressed state prior to assembly, and the annular extended portion is internally expanded in assembly such that the resulting thickness of the cavity is less than the composite thickness of the stem portion and the hose in its uncompressed state. A radial recess can be cut into the flange portion such that it opens into the cavity, and a radially raised portion can be provided on the stem portion to engage in positive interlock within the radial recess when the elements are fitted together and thereby further prevent axial displacement of the elements.

The fitting described above offers several distinct advantages over fittings previously designed in that the fitting of the invention can be easily assembled. In assembling, the second element is initially slipped on the hose, and the hose end portion is then inserted in the cavity of the first element. Once the elements are positioned in this manner they are in substantial axial alignment with each other. By bringing the first element axially toward the second element and forcing the stem portion into the cavity about the hose end portion, the relative dimensions of the fitting of the invention are such that a radial compressive force is produced on the stem portion and the hose end portion to compress it into the annular extended portion in tight locking arrangement. Optionally, the interlock can be made more secure by internally expanding the annular extended portion outwardly.

Figure 2:
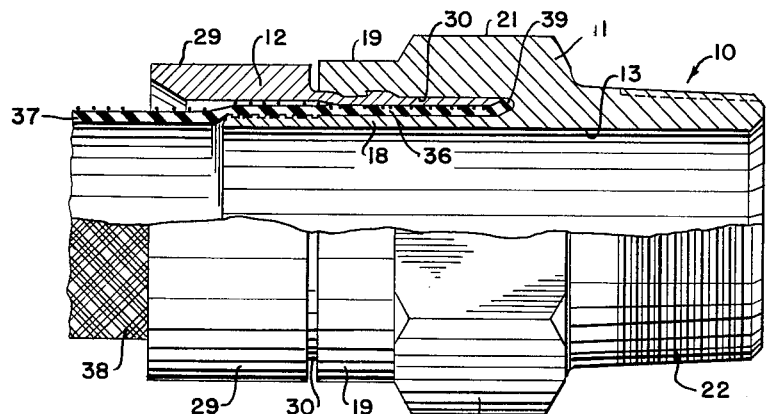
Figure 3:
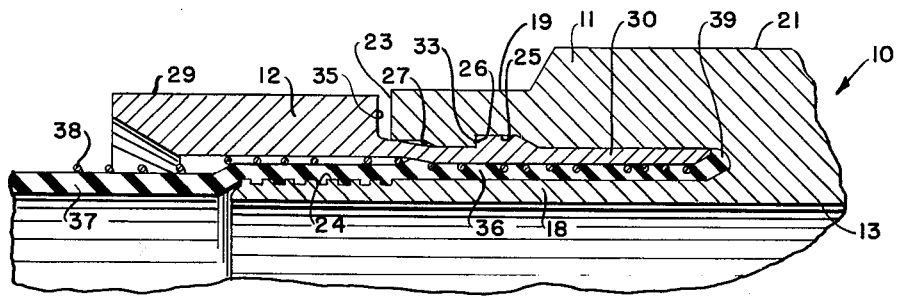

A preferred embodiment of the invention is described hereinbelow with reference to the drawing wherein:

FIG. 1 is a longitudinal elevation partly in section of the elements of the end fitting positioned on a reinforced flexible hose prior to assembly; and FIG. 2 is a longitudinal elevation partly in section of the end fitting assembled on a flexible hose; and FIG. 3 is an enlarged fragmentary longitudinal elevation substantially as shown in FIG. 2.

Referring to the drawing, the end fitting 10 is comprised of a first body element 11 and a second sleeve element 12. The body element 11 has a generally cylindrical shape with an axial bore 13 extending completely therethrough. Opening into one end portion 14 of the body element 11 is an annular cavity 15. The cavity 15 extends axially into the body element 11 and terminates with a circular wall 16 substantially halfway into the body element. The cavity 15 is formed with an inner wall 17 which is defined by an integral annular extended portion 18 of the body element which protrudes axially outwardly therefrom and in part serves to define the bore 13. The annular extended portion 18 which has a uniform outer diameter substantially throughout its length is surrounded in radially outwardly spaced relationship by an integral flange portion 19 of the body element 11, which serves to define an outer wall 20 of the cavity 15. Located at substantially the mid-point of the body element 11 is a raised hexagonal portion 21 of increased thickness from the remainder of the body element. The hexagonal portion 21 combines with the flange portion 19 to define the outer wall 20 of the cavity 15. Extending from the hexagonal portion 21 in a direction opposite to the direction of the extended portion 18 is a threaded portion 22. The threaded portion 22 combines with the extended portion 18 to define the axial bore 13.

It is to be noted that the thickness of the flange portion 19 is greater than the thickness of the extended portion. Also the extended portion 18 protrudes axially beyond the end 23 of the flange portion, and has serrations 24 formed on the protruding portion. As best shown in FIG. 3, cut into the outer wall 20 of the cavity 15 is an annular radial recess 25. This recess has an annular shoulder surface 26 which extends in a plane perpendicular to axis of the fitting. A stepped outwardly flaring portion 27 is provided on the outer wall 20 adjacent the end portion 14 of the flange portion 19.

As shown in FIG. 1, the axial bore 13 is not of a uniform diameter throughout. The annular extended portion has a smaller diameter than the diameter of the threaded portion 22. This embodiment is formed in this manner to permit the extended portion to be internally expanded once the elements are assembled.

The sleeve element 12 also has a generally cylindrical shape with a substantially uniform diameter axial bore 28 extending completely therethrough. It is characterized by a generally cylindrical end portion 29 and an integral stem portion 30 of greatly reduced thickness extending axially from the end portion. The axial bore 28 of the sleeve element 12 is of such a diameter as to permit the sleeve element to be slipped over a hose 31. The stem portion 30 has a smaller thickness than the thickness of the cavity 15 and has an inside and outside diameter such that when the sleeve element 12 and the body element 11 are substantially co-axially aligned, the stem portion is substantially aligned with the cavity for insertion therein. As shown in FIG. 1, the outside diameter of the stem portion 30 which is circumferentially continuous is preferably larger than the diameter of the outer cavity wall to provide a biased fit between the elements. Formed on the stem portion 30 is an annular radially raised portion 32. This annular raised portion 32 has a flat raised shoulder surface 33 which extends in a plane perpendicular to the axis of the fitting, and a tapered surface 34 tapering in a direction away from the end portion 29. This raised shoulder surface 33 is designed to engage flush against the recess shoulder surface 26 in a positive interlock when the elements are interconnected. As shown there is a sleeve shoulder 35 defined on the sleeve element 12 by the difference in diameter between the end portion 29 and the stem portion 30.

In assembling the two elements, the sleeve element 12 is first slid about the hose 31 with the stem portion 30 closest to the end portion 36 of the hose. This sliding of the sleeve element onto the hose 31 can be facilitated by providing a flared end on end portion 29 of the sleeve. The hose shown is comprised of a plastic inner tubular member 37 and a metal braided outer surface 38. Once the sleeve element 12 is in place, the end portion 36 of the hose is inserted into the cavity 15 around the extended portion 18 of the body element 11, and the sleeve element can be located substantially co-extensive with the hose to aid in insertion of the hose end portion 36, which is often flared, into the cavity. After inserting the hose end portion 36 into the cavity 15, the sleeve element is brought axially forward and the stem portion 30 is forced into the cavity 15 about the hose end portion. As shown, the composite thickness of the hose 31 and the stem 30 is greater than the thickness of the cavity 15, and the stem portion has a length slightly less than the depth of the cavity. Also as noted above, the outside diameter of the stem portion is greater than the diameter of the outer wall 20 of the cavity 15. Accordingly, the body element 11 is held in a fixed position to make certain that the hose end portion 36 remains in its position within the cavity. The stem portion 30 is then forced into the annular cavity 15 around the hose end portion 36. The end portion 29 of the sleeve element 12 provides an excellent gripping surface for implementing this operation by use of simple tools. As the stem portion 30 is inserted into the cavity it tends to move the hose end portion axially toward the circular wall 16 such that an edge 39 of the hose is flared outwardly against the wall 16 and is pinched between the end of the stem portion 30 and the wall 16. Because the stem portion 30 is of a larger diameter than the diameter of the outer cavity wall, as it is inserted into the cavity, it is swaged down against the hose end portion 36 radially toward the extended portion 18 and produces a compressive effect between the elements within the cavity. There is also a sufficient compressive force maintained between the serrated portion 24, which underlies the end portion 29 of the sleeve element 12, and the end portion 29 to permit the inner plastic tubular member of the hose to be pressed between the serrations so as to provide a further seal. As shown in FIG. 2, in its assembled position, the annular raised portion 32 is positioned within the annular recess 25 and the respective shoulder surfaces 26 and 33 are in flush opposed contact to provide a positive interlock therebetween further to preclude axial displacement between the two elements of the fitting. Also, the shoulder 35 is located adjacent of the body end portion 14, or can abut against the end portion 23.

In assembling the fitting shown in the drawing, after the two elements were interlocked, a mandrel was inserted into the body element and the extended portion 18 was expanded outwardly so as further to compress the hose and produce a tight fit between the two elements. By expanding the extended portion, the serrated portion 24 is embedded into the plastic tubular member and since the flange portion 19 is sufficiently thicker than the extended portion 18 and the stem portion 30, the stem portion is pressed against the outer wall 20 of cavity 15 which increases the frictional interlock of tubing 37, metal braid 38 and stem portion 30. This also increases the mechanical interlock of annular radial raised portion 32 into annular radial recess 25.

I claim:
1. A two-element hose end fitting assembly configured for interlocking fixed attachment to the end portion of a hose comprising:
 (I) a first fitting element formed to receive the hose end and having an axial bore extending therethrough;
  (a) an integral annular substantially cylindrically shaped extended portion of said first element axially extending therefrom, said extended portion having a uniform outer diameter substantially throughout its length;
  (b) an integral flange portion of said first element extending axially therefrom and surrounding and radially spaced from the extended portion to define with said extended portion an annular cavity which is formed axially into and terminates within said first element;
  (c) a central raised portion for said first fitting element of increased thickness defining at least a portion of said flange in which said cavity terminates, said raised portion extending beyond the cavity termination to provide an extended gripping length; and
  (d) an annular recess in said flange portion opening into said cavity; and
 (II) a second fitting element configured for co-axial alignment with said first element and having an axial bore therein of sufficient diameter to fit over the end portion of the hose to be attached thereto and formed to fit into said annular cavity with the hose end portion;
  (a) an integral circumferentially continuous cylindrical stem portion of said second fitting element extending axially therefrom to a length substantially equal to the axial depth of the cavity and having an outside diameter larger than the inside diameter of said flange portion, said stem portion having a sufficiently small cross-sectional thickness so as to permit radial displacement into the cavity toward said extended portion by the flange portion upon being force fitted into said cavity but of sufficiently large cross-sectional thickness so that the combined thickness of the stem portion and the uncompressed hose is greater than the radial distance between the extended portion and flange portion to compress the hose end portion radially between it and said extended portion and thereby maintain the two elements interlocked in fixed attachment with a hose solely by their dimensional configuration, and
  (b) a radially raised portion on said stem portion which engages in positive interlock within said annular recess when said elements are fitted together to prevent axial displacement of the elements relative to each other.
2. A two-element hose end fitting assembly configured for interlocking fixed attachment to the end portion of a hose comprising:
 (I) a first fitting element formed to receive the hose end and having an axial bore extending therethrough;
  (a) an integral annular substantially cylindrically shaped extended portion of said first element axially extending therefrom, said extended portion having a uniform outer diameter substantially throughout its length;
  (b) an integral flange portion of said first element extending axially therefrom and surrounding and radially spaced from the extended portion to define with said extended portion an annular cavity which is formed axially into and terminates within said first element, said extended portion protruding axially beyond the end of said flange portion and having serrations on the protruding portion for addiitonal sealing;
  (c) a central raised portion for said first fitting element of increased thickness defining at least a portion of said flange in which said cavity terminates said raised portion extending beyond the cavity termination to provide an extended gripping length; and
  (d) an annular recess in said flange portion opening into said cavity; and
(II) a second fitting element configured for co-axial alignment with said first element and having an axial bore therein of sufficient diameter to fit over the end portion of the hose to be attached thereto and formed to fit into said annular cavity with the hose end portion;
  (a) an integral circumferentially continuous cylindrical stem portion of said second fitting element extending axially therefrom to a length substantially equal to the axial depth of the cavity and having an outside diameter larger than the inside diameter of said flange portion, said cavity thickness being larger than the composite thickness of the stem portion and the hose in its uncompressed state prior to assembly with the annular extended portion being of smaller inside diameter than the remainder of the first fitting assembly so that it can be internally expanded in assembly to reduce the thickness of the cavity to less than the composite thickness of the stem portion and the hose in its uncompressed state, said stem portion having a sufficiently small cross-sectional thickness so as to permit radial displacement into the cavity toward said extended portion of the flange portion upon being force fitted into said cavity but of sufficiently large cross-sectional thickness so that the combined thickness of the stem portion and the uncompressed hose is greater than the radial distance between the extended portion and flange portion in their assembled position to compress the hose end portion radially between it and said extended portion and thereby maintain the two elements interlocked in fixed attachment with a hose solely by their dimensional configuration; and
  (b) a radially raised portion on said stem portion which engages in positive interlock within said annular recess when said elements are fitted together to prevent axial displacement of the elements relative to each other.

References Cited by the Examiner

UNITED STATES PATENTS

| | | | |
|---|---|---|---|
| 773,965 | 11/04 | McIntyre. | |
| 1,497,453 | 6/24 | Levitt | 285—249 |
| 1,701,829 | 2/29 | Walker | 285—249 |
| 1,955,930 | 4/34 | Oliver | 285—243 |
| 2,103,838 | 12/37 | Bach. | |
| 2,485,049 | 10/49 | Hallisy | 285—258 |
| 2,595,900 | 5/52 | Soos | 285—258 |
| 2,698,191 | 12/54 | Samiran | 285—248 |
| 2,832,130 | 4/58 | Harvey. | |
| 3,156,491 | 11/64 | Jackson et al. | 285—243 |

FOREIGN PATENTS 1,270,103    7/61    France.

CARL W. TOMLIN, *Primary Examiner.*

THOMAS F. CALLAGHAN, *Examiner.*